United States Patent
Bonn et al.

[15] 3,655,152
[45] Apr. 11, 1972

[54] STRETCH FABRIC PARACHUTE CANOPY

[72] Inventors: Clifford Bonn, Buffalo, N.Y.; Kenneth R. A. Wilson, Redondo Beach, Calif.

[73] Assignee: Irvin Air Chute, Limited, Fort Erie, Ontario, Canada

[22] Filed: Mar. 17, 1970

[21] Appl. No.: 20,254

[52] U.S. Cl. .................................................. 244/145
[51] Int. Cl. ................................................ B64d 17/12
[58] Field of Search ............................. 244/145, 142

[56] References Cited

UNITED STATES PATENTS

| | | | |
|---|---|---|---|
| 3,013,753 | 8/1960 | Hughes et al. | 244/145 |
| 2,527,553 | 10/1950 | Ingles | 244/145 |
| 3,032,072 | 5/1962 | Weiner et al. | 244/145 X |
| 3,222,016 | 12/1965 | Boone | 244/145 |
| 3,386,692 | 6/1968 | Schuerch | 244/145 X |

Primary Examiner—Trygve M. Blix
Assistant Examiner—Carl A. Rutledge
Attorney—Rommel and Rommel

[57] ABSTRACT

A stretch fabric parachute canopy having relatively low air permeability in low speed escape and a relatively high air permeability in high speed escape.

8 Claims, 9 Drawing Figures

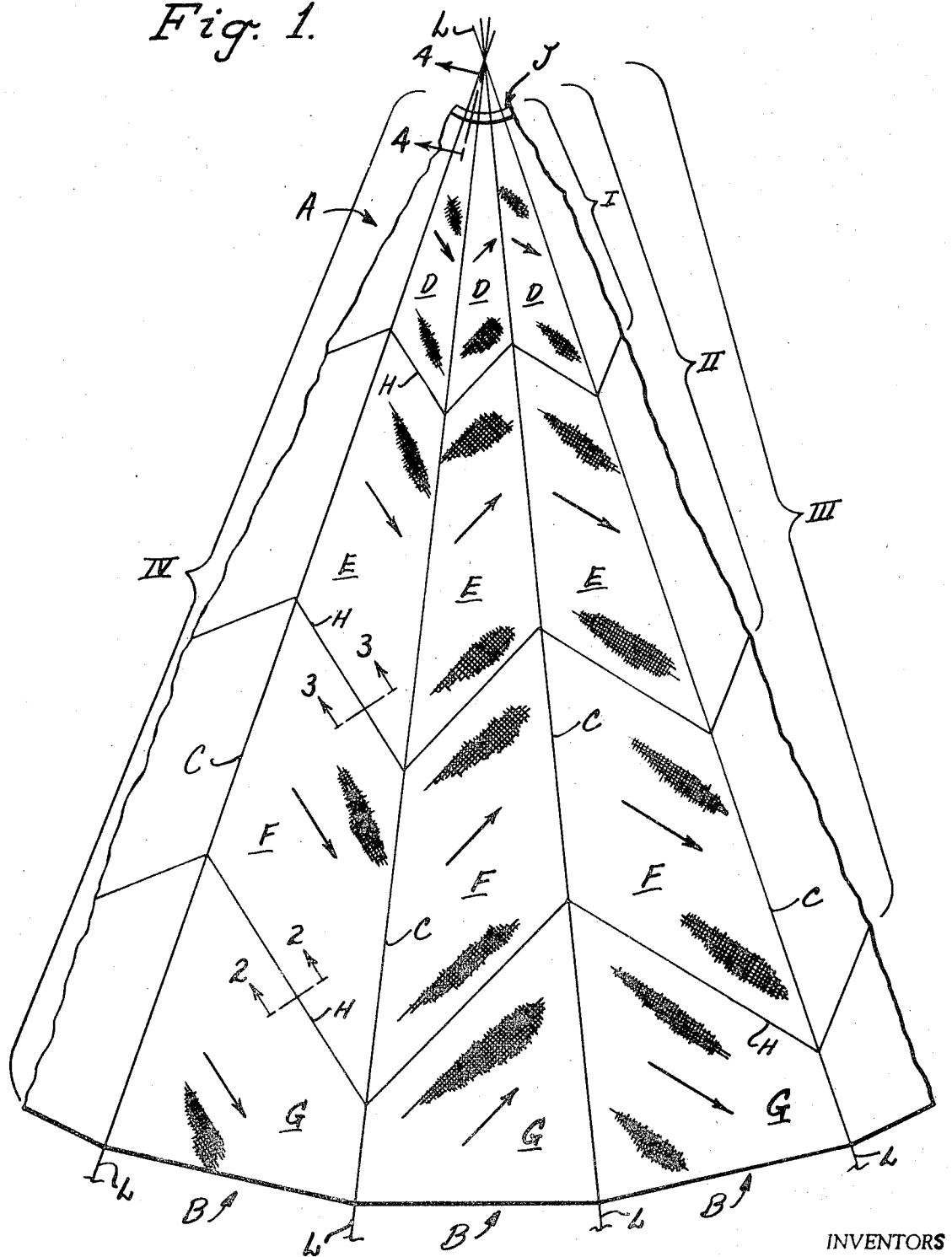

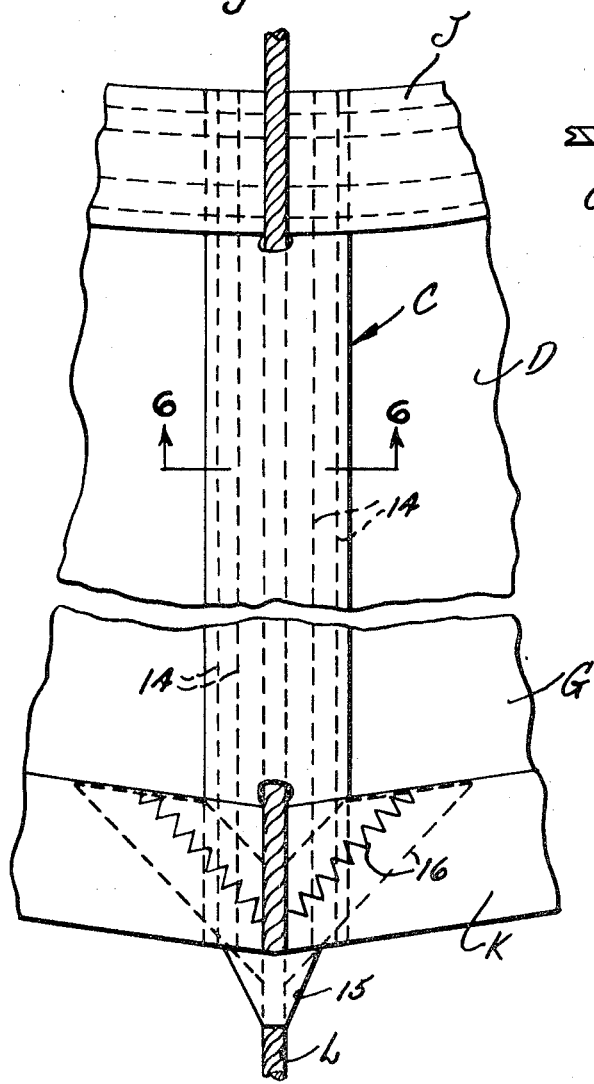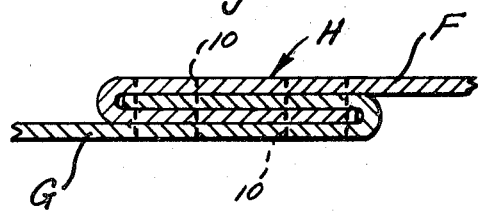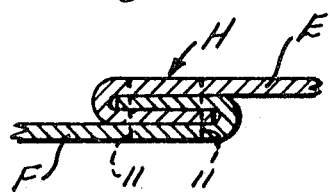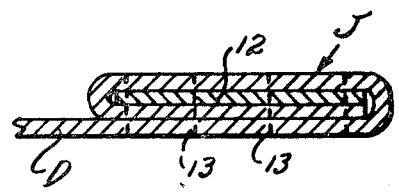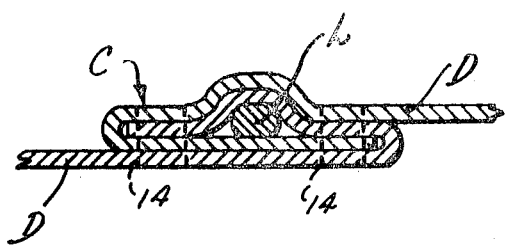
INVENTORS
CLIFFORD BONN
KENNETH R.A. WILSON
BY *Rommel and Rommel*
ATTORNEYS Patented April 11, 1972

INVENTORS
CLIFFORD BONN
KENNETH R. A. WILSON
BY Rommel and Rommel
ATTORNEYS

STRETCH FABRIC PARACHUTE CANOPY

This invention relates to improvements in parachute canopies.

In the use of present day standard parachutes, the majority of which have a canopy of nylon having an air permeability of from 80–120 cubic feet per square foot of fabric per minute at one-half inch water pressure, a twofold problem exists in connection with personnel escape from aircraft, namely, dangerously high parachute opening magnitudes at high velocity escape, and unacceptably long parachute opening times in low speed, low altitude escape which may not permit the parachute to open fully prior to impact. It is thus a primary object of this invention to provide a parachute canopy having relatively low air permeability in low speed escape and a relatively high air permeability in high speed escape.

In brief, the invention relates to the provision of a canopy having at least a portion thereof comprised of stretch fabric. We realize that others have heretofore sought to provide a parachute canopy in which air permeability may be temporarily increased on the order of 9 percent by use of rip-stop threads of stretch yarn, such as set forth in U.S. Pat. No. 3,032,072. However, such use of rip-stop stretch yarn has not provided a canopy having the desired characteristics for both high and low speed escape.

It is a further object of this invention to provide a parachute canopy having at least a portion thereof comprised of stretch fabric wherein there exists substantially balanced elongation between the stretch fabric panels and the main seams.

Other objects and advantages of the invention will become apparent from the following description, taken in connection with the accompanying drawings, and in which drawings:

FIG. 1 is a fragmentary plan view of a canopy constructed according to our invention.

FIGS. 2, 3 and 4 are enlarged sectional views respectively taken substantially along the lines 2—2, 3—3, and 4—4 of FIG. 1.

FIG. 5 is a fragmentary plan view of a main seam of a canopy constructed according to our invention.

FIG. 6 is an enlarged sectional view taken substantially along the line 6—6 of FIG. 5.

Figure 7:
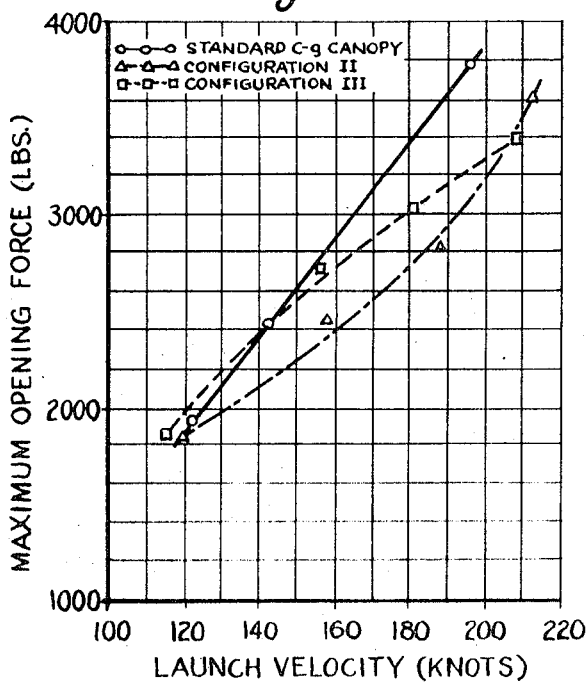
FIGS. 7, 8 and 9 are graphs illustrating relative characteristics as between a standard canopy and canopies according to our invention.

In the drawings, wherein are shown preferred embodiments of the invention, and wherein similar reference characters designate corresponding parts throughout the several views, the letter A may generally designate a canopy according to our invention and which has a plurality gores B jointed together such as by main seams C, each gore B including a plurality of panels D, E, F & G which may be joined such as by cross seams H, and wherein canopy A may also include a vent seam J, a skirt seam K and suspension lines L.

Insofar as the term "stretch fabric" is used in this disclosure, it is to be understood as meaning a fabric in which the warp, weft, or both are comprised of stretch or elastic yarns.

"Conventional fabric" is to be understood as a substantially non-stretch fabric, i.e., one in which either no stretch or elastic yarn or a de minimis quantity of stretch or elastic yarn is used in the construction thereof.

The stretch fabric preferably has an air permeability under substantially zero tension of from 0 to 40 cubic feet per square foot per minute at one-half inch water differential pressure and air permeability under substantially maximum tension without permanent set of from 600 to 1,000 cubic feet per square foot per minute at one-half inch water differential pressure. These limits contemplate use of a uni-directional stretch fabric, that is, one in which the stretch yarns comprise either the warp or weft, conventional non-stretch yarn comprising the other.

In certain instances, such as in ultra high altitude ejection, or for some cases of carbo parachute, parameters of, for example, air permeability under substantially maximum tension without permanent set of 3,000 cubic feet per square foot per minute at one-half inch water differential pressure may be desirable in which case omni-directional stretch fabric may be used, i.e., stretch fabric in which both the warp and weft comprise stretch yarns.

Inasmuch as both weight and bulk may be critical factors in a given parachute construction, it is anticipated that preferred construction according to this invention will embody use of stretch fabric having a uni-directional line of primary stretch, providing reduced bulk over an omni-directional stretch fabric, and wherein the stretch is provided through use of a stretch yarn, rather than elastic yarn, providing reduced weight.

A stretch fabric which we have found acceptable is one having a warp construction of not less than substantially 185 ends per inch of 30 denier high tenacity nylon 66 and a weft construction of not less than 140 picks per inch of 40 denier spandex fiber clad in two ends of 15 denier medium tenacity nylon 66.

A type of "spandex fiber" found suitable in "Lycra," which may be generally defined as a manufactured fiber in which the fiber forming substance is a long chain synthetic elastomer comprised of at least 85 percent of a segmented polyurethane.

A standard 28 foot diameter canopy of conventional fabric is frequently referred to as a standard C-9 canopy, and this designation will also be applied thereto in this disclosure.

Referring to FIG. 1, form I of the invention is wherein only panel D of each gore B is of stretch fabric, panels E. F and G being of conventional fabric; form II is wherein panels D and E of each gore B are of stretch fabric, panels F and G being of conventional fabric; form III is wherein panels D, E and F of each gore B are of stretch fabric, panel G being of conventional fabric; and form IV is wherein all panels of gore B are of stretch fabric.

Referring to Form I, the ratio of stretch fabric to conventional fabric is such that the area of the stretch fabric is so small as to only slightly effect opening force at high speeds and opening time at low speeds, as compared to a standard C-9 canopy.

Referring to Form II, the same provides a concave curve relationship between opening force and launch speed (see FIG. 7) which shows that there is a marked improvement over a standard C-9 canopy up to a velocity of approximately 220 knots, beyond which it will produce forces greater than a standard C-9 canopy.

Referring to Form III, the same provides a convex curve, relationship between opening force and launch speed (see FIG. 7) which suggests that the greater the launch speed, the greater the reduction in opening force over a standard C-9 canopy. A tabulated comparison between form III and a standard C-9 canopy is as follows:

| VELOCITY (Knots) | C-9 | FORCE Form III | REDUCTION (Percent) |
|---|---|---|---|
| 120 | 2400 | 2400 | 0 |
| 180 | 3200 | 3000 | 6.6 |
| 210 | 4100 | 3200 | 28.1 |
| 230 | 4900 | 3700 | 32.4 |

At velocity below 120 knots, form III provides slightly higher opening forces than the standard C-9 canopy, however, opening forces at such relatively low launch speeds are not of such magnitude to cause any problems.

Figure 8:
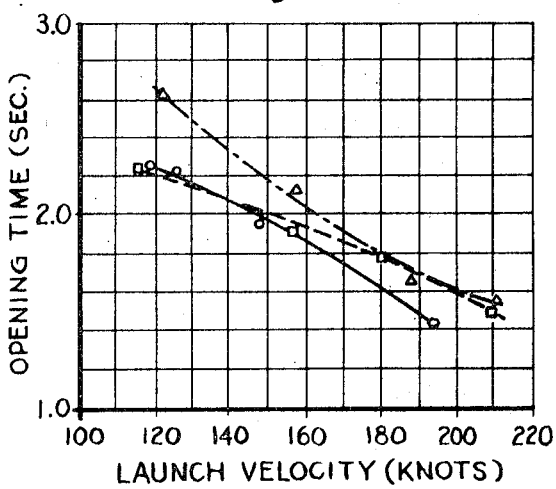
Figure 9:
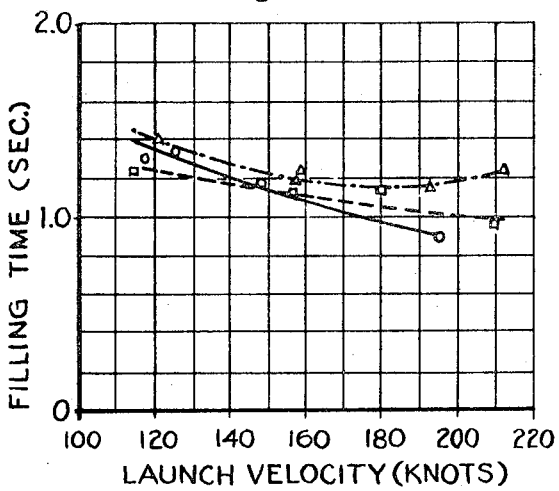

The graphs of FIGS. 7, 8, and 9 provide a basis for comparison between Form II, Form III, and the standard C-9 canopy.

The graphs of FIGS. 7, 8, and 9 were calibrated by ejection of a 250 pound dummy at 1,500 feet. The legend of FIG. 7 also applies to FIGS. 8 and 9. An analysis of these graphs shows that form III apparently yields optimum results in that it not only provides that lower opening forces at high velocities (FIG. 7), but also provides shorter opening time (FIG. 8) and shorter filling time (FIG. 9) at lower velocities, showing that the same is also more effective for low speed, low altitude escape. Since Form III is deemed to provide optimum results, the same has been used for the purposes of showing the seams of FIGS. 2, 3, 4 and 6.

Referring to Form IV, the same will provide lower opening forces at high velocities, but the increased air permeability adjacent the skirt seems to interfere with the proper filling pattern. To put it another way, an area of conventional fabric adjacent the skirt of a canopy which is otherwise comprised of stretch fabric contributes to faster opening of the canopy, particularly at lower velocities.

The usual standard parachute construction is by way of a plurality of gores having four panels each, and this is the form which is thus shown and described in this disclosure. It is of course to be understood that the ratio of stretch fabric to conventional fabric is the criteria to be applied, regardless of the particular construction of the canopy, for instance, as regards Form III, a canopy comprising substantially 75 percent stretch fabric and 25 percent conventional fabric.

It is also to be understood that the invention will be applicable to various other types of parachutes, ribbon, ring-slot, etc. The invention is also deemed to cover both personnel and cargo parachutes.

As previously disclosed, a stretch fabric which we have found to be acceptable has a stretch yarn weft construction and a conventional substantially non-stretch yarn warp construction. We prefer to cut the fabric on the bias to provide panels having a warp direction extending diagonally across the panel, as shown by the arrows FIG. 1. This pattern is preferably followed with respect to both the stretch fabric panels and the conventional fabric panels of a given gore. Preferably, the warp direction extends at substantially 45° with respect to the main seam and the warp of corresponding panels of adjacent panels extend substantially 90° with respect to each other. Such directional cutting and fitting provides more uniform stress through the main seams.

As shown in FIG. 2 no radical departure in cross seam construction is necessary with respect to interconnection of the stretch fabric of panel F to the conventional fabric of panel G by stitches 10; as shown in FIG. 3, there is also no radical departure from conventional cross seam construction in interconnection of the stretch fabric of panel D to the stretch fabric of panel E by stitches 11; and, as shown in FIG. 4, substantially conventional vent seam construction is utilized in interconnection of the stretch fabric of panel D to a tape 12 by stitches 13.

The construction of main seam H is shown in FIGS. 5 and 6, which may comprise an inter-folding of panels of adjacent gores about a suspension line L and interconnection thereof such as by stitches 14. Skirt K may be provided with a reinforcement 15 and reinforcing stitches 16 in attachment of the suspension lines L thereto.

In conventional parachute construction, the suspension lines through the main seam are usually shorter than the length of the seam so that the opening forces are transmitted through the suspension network rather than through the main seam. In the use of stretch fabric for the canopy construction we prefer to provide suspension lines which are longer than the main seam, in order to provide balanced elongation between the stretch fabric panels and the main seam. This construction also enables us to use lighter suspension lines, due to the fact that they need to absorb less force than those used in conventional construction.

Various changes may be made in the shape, size and arrangement of the parts herein shown and described without departing from the spirit of the invention or the scope of the following claims.

We claim:

1. A parachute having a canopy including a drag area wherein substantially 75 percent of the fabric area thereof comprises stretch fabric and substantially 25 percent of the fabric area thereof comprises conventional fabric, the conventional fabric area thereof being disposed adjacent the skirt of the canopy, said stretch fabric having a warp construction of not less than substantially 185 ends of substantially non-stretch yarn per inch and a weft construction of not less than 140 picks of stretch yarn per inch, having an air permeability under substantially zero tension of from 0 to 40 cubic feet per square foot per minute at one-half inch water differential pressure and an air permeability under substantially maximum tension without permanent set of from 600 to 1,000 cubic feet per square foot of fabric per minute at one-half inch water differential pressure, and the directional line of primary stretch of said stretch fabric extends diagonally with respect to the radius of the canopy.

2. A parachute as specified in claim 1 wherein the substantially non-stretch yarn of said stretch fabric comprises 30 denier high tenacity nylon and the stretch yarn of said stretch fabric comprises 40 denier spandex fiber clad in two ends of 15 denier medium tenacity nylon.

3. A parachute having a canopy in which the main drag area thereof is at least partly comprised of stretch fabric having a weave pattern in which all of the threads running in a given direction are of stretch yarn, said stretch fabric having an air permeability under substantially zero tension of from 0 to 40 cubic feet per square foot per minute at one-half inch water differential pressure and has an air permeability under substantially maximum tension without permanent set of from 600 to 1,000 cubic feet per square foot of fabric per minute at one-half inch water differential pressure.

4. A parachute as specified in claim 3 wherein said canopy comprises a plurality of gores that are each provided with a plurality of panels, at least some of said gores including panels of stretch fabric having a uni-directional line of primary strength which extends diagonally across the panel.

5. A parachute as specified in claim 3 wherein said canopy comprises a plurality of gores provided with a plurality of panels and in which at least a panel of said gores adjacent the skirt of said canopy is of non-stretch fabric and the area of non-stretch fabric of each gore comprises substantially 25 percent of the fabric area thereof.

6. A parachute as specified in claim 4 wherein the line of primary stretch extends at substantially 45° with respect to an adjacent radial seam.

7. A parachute as specified in claim 2 wherein said stretch fabric has a warp construction of not less than substantially 185 ends of substantially non-stretch yarn per inch, and a weft construction of not less than 140 picks of stretch yarn per inch.

8. A parachute as specified in claim 3 wherein said canopy includes main seams having suspension lines attached thereto and wherein said suspension lines are of a length from skirt to apex of said canopy longer than said main seams.

* * * * *